US008553002B2

(12) United States Patent
Homma et al.

(10) Patent No.: US 8,553,002 B2
(45) Date of Patent: Oct. 8, 2013

(54) INFORMATION PROCESSING APPARATUS, INFORMATION PROCESSING METHOD, AND COMPUTER PROGRAM

(75) Inventors: Fuminori Homma, Tokyo (JP); Tatsushi Nashida, Kanagawa (JP)

(73) Assignee: Sony Corporation, Tokyo (JP)

( * ) Notice: Subject to any disclaimer, the term of this patent is extended or adjusted under 35 U.S.C. 154(b) by 182 days.

(21) Appl. No.: 13/166,129

(22) Filed: Jun. 22, 2011

(65) Prior Publication Data

US 2012/0044170 A1  Feb. 23, 2012

(30) Foreign Application Priority Data

Aug. 19, 2010  (JP) ................................. 2010-183865

(51) Int. Cl.
  *G06F 3/041* (2006.01)
(52) U.S. Cl.
  USPC .......................................... 345/173; 345/168
(58) Field of Classification Search
  USPC .................... 345/156, 168, 173, 179, 174; 178/18.06, 19.03, 19.04
  See application file for complete search history.

(56) References Cited

U.S. PATENT DOCUMENTS

| | | | | |
|---|---|---|---|---|
| 7,231,231 | B2* | 6/2007 | Kokko et al. | 455/566 |
| 8,003,875 | B2* | 8/2011 | Wang et al. | 84/615 |
| 8,335,887 | B2* | 12/2012 | Kim et al. | 711/103 |
| 2004/0021643 | A1* | 2/2004 | Hoshino et al. | 345/173 |
| 2004/0108995 | A1* | 6/2004 | Hoshino et al. | 345/173 |
| 2006/0161871 | A1* | 7/2006 | Hotelling et al. | 715/863 |
| 2007/0125633 | A1* | 6/2007 | Boillot | 200/52 R |
| 2008/0018614 | A1* | 1/2008 | Rekimoto | 345/173 |
| 2008/0042985 | A1* | 2/2008 | Katsuhito et al. | 345/173 |
| 2008/0100572 | A1* | 5/2008 | Boillot | 345/158 |
| 2008/0122796 | A1* | 5/2008 | Jobs et al. | 345/173 |
| 2009/0251422 | A1* | 10/2009 | Wu et al. | 345/173 |
| 2009/0284482 | A1* | 11/2009 | Chin | 345/173 |
| 2010/0004029 | A1* | 1/2010 | Kim | 455/566 |
| 2010/0090964 | A1* | 4/2010 | Soo et al. | 345/173 |
| 2010/0099394 | A1* | 4/2010 | Hainzl | 455/418 |
| 2010/0149119 | A1 | 6/2010 | Homma et al. | |
| 2010/0279738 | A1* | 11/2010 | Kim et al. | 455/566 |
| 2010/0321324 | A1* | 12/2010 | Fukai et al. | 345/173 |
| 2011/0138336 | A1* | 6/2011 | Kim | 715/848 |
| 2011/0175832 | A1 | 7/2011 | Miyazawa et al. | |
| 2012/0113018 | A1* | 5/2012 | Yan | 345/173 |

FOREIGN PATENT DOCUMENTS

JP  2009-187311  8/2009

* cited by examiner

*Primary Examiner* — Joe H Cheng
(74) *Attorney, Agent, or Firm* — Oblon, Spivak, McClelland, Maier & Neustadt, L.L.P.

(57) ABSTRACT

There is provided an information processing apparatus including a detection section configured to detect contact/proximity of an operating object with/to a display surface of a display section on which objects classified into groups in accordance with a relationship between the objects are displayed, a proximity determination section configured to determine a degree of proximity of the operating object to the display surface based on a detection result obtained by the detection section, and an operation-lock determination section configured, when the proximity determination section determines that the operating object touches the display surface, to disable an operation input to an object belonging to a group different from a group which an object that the operating object touches belongs to, until the operating object is positioned outside a proximity detection region, the proximity detection region being a region from the display surface to positions which are a predetermined distance away therefrom.

14 Claims, 14 Drawing Sheets

FIG.10
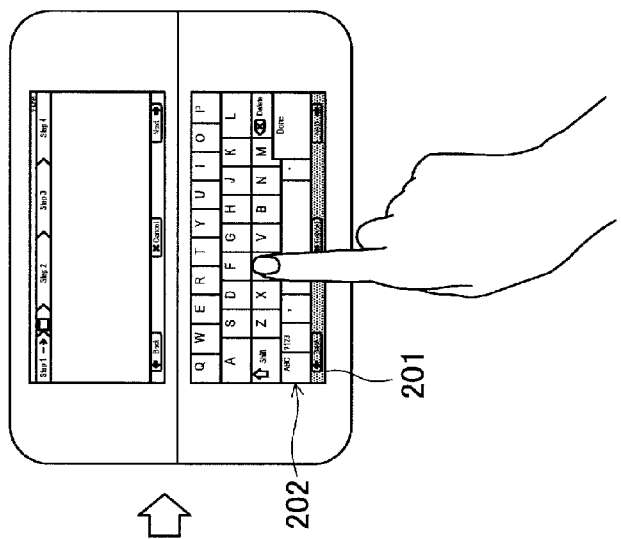
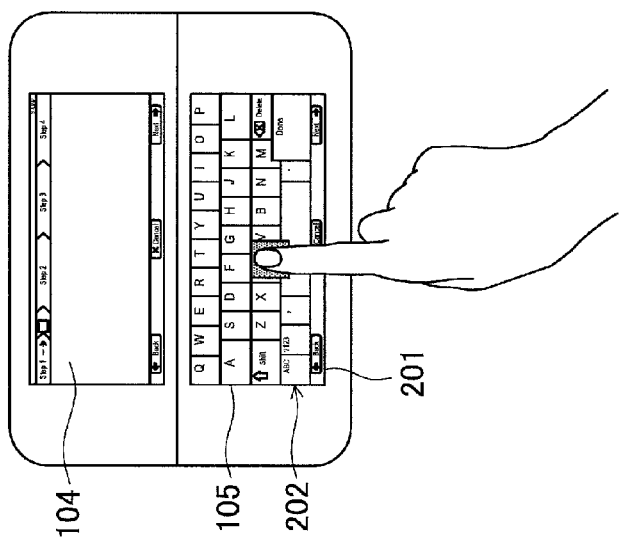

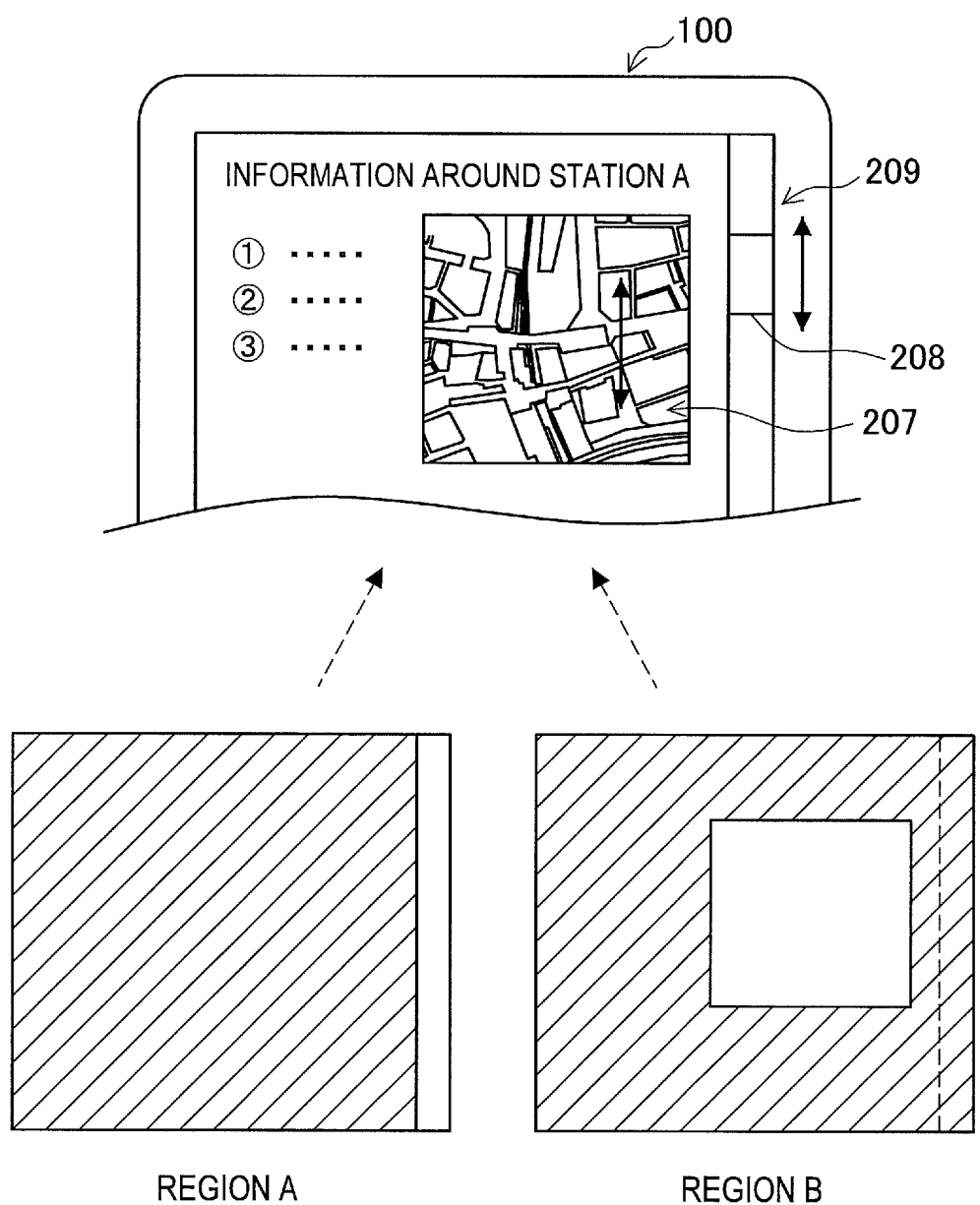

INFORMATION PROCESSING APPARATUS, INFORMATION PROCESSING METHOD, AND COMPUTER PROGRAM

BACKGROUND

The present disclosure relates to an information processing apparatus, an information processing method, and a computer program for controlling an operation input to a display device such as a touch panel.

As an erroneous operation which occurs during operation of a display device such as a touch panel, there is exemplified a case of performing an operation input to a region other than a GUI component, such as a button, displayed on a display screen. Such an erroneous operation is generally attributed to parallax caused by displacement between a position of the displayed GUI component and a position of user's viewpoint.

As technology for preventing or controlling such an erroneous operation, there is disclosed, in JP 2009-187311A, technology for providing a boundary region between GUI components which are adjacent to each other, and, in the case where the boundary region is pressed, determining which of the adjacently placed GUI components the user is trying to press based on an input history of the GUI components. Accordingly, which GUI components the user is trying to press can be appropriately recognized.

SUMMARY

However, the technology of JP 2009-187311A uses a unique layout determination system that determines whether position information indicating a position at which the user presses on the display screen of a touch panel is included in a GUI component-input acceptance region based on input acceptance region management data. Therefore, there was an issue that it was difficult to apply the technology to a general Windows system, such as Windows (registered trademark) or Android (registered trademark).

On the other hand, there are set in a general Windows system beforehand not only a GUI component but also a mechanism for managing a plurality of GUI components as a group. For example, as for examples of buttons, there are given GUI component groups each containing a plurality of buttons, such as an on-screen keyboard (hereinafter, referred to as "OSK"), a toolbar, and a navigation bar. Processing performed when a button on each of those GUI component groups is pressed differs from one another. For example, in the case where a button belonging to the OSK group is pressed, processing corresponding to a keyboard input is performed. On the other hand, in the case where a button belonging to the navigation bar group is pressed, there is performed processing such as an operation of moving from a screen currently being displayed into a previous or next screen or an operation of cancelling all operations that have been input.

Further, when the user performs an operation input, a purpose of using the GUI component group for performing the operation input differs from one group to another. For example, the user uses the OSK for the purpose of typing faster, and uses the navigation bar for the purpose of performing selection processing such as decision or cancel more carefully.

In this way, when the GUI component groups each having a processing result and a purpose of the user different from each other are placed adjacently within the display region, there may occur an erroneous operation of pressing a button on a GUI component group which is not the GUI component group that the user intended to use. This erroneous operation leads to execution of processing which is largely different from the processing that the user intends to execute, and a burden imposed on the user at the time of the erroneous operation being executed is generally greater compared to the case of performing an erroneous operation of buttons and the like within a single GUI component group.

In light of the foregoing, it is desirable to provide an information processing apparatus, an information processing method, and a computer program, which are novel and improved, and which are capable of preventing an erroneous operation of a user and making it easier to perform an operation input intended by the user.

According to an embodiment of the present disclosure, there is provided an information processing apparatus which includes a detection section configured to detect contact of an operating object with and proximity of the operating object to a display surface of a display section on which objects classified into groups in accordance with a relationship between the objects are displayed, a proximity determination section configured to determine a degree of proximity of the operating object to the display surface based on a detection result obtained by the detection section, and an operation-lock determination section configured, when the proximity determination section determines that the operating object touches the display surface, to disable an operation input to an object belonging to a group different from a group which an object that the operating object touches belongs to, until the operating object is positioned outside a proximity detection region, the proximity detection region being a region from the display surface to positions which are a predetermined distance away therefrom.

When the proximity determination section determines that the operating object touches the display surface, the operation-lock determination section may determine whether or not an operation input to an object that the operating object touches is disabled, and when the operation input to the object that the operating object touches is not disabled, the operation-lock determination section may disable an operation input to an object belonging to a group different from the group which the object that the operating object touches belongs to.

The information processing apparatus according to an embodiment of the present disclosure may further include a setting storage section configured to store a group which the object belongs to. In this case, the operation-lock determination section may acquire, from the setting storage section, a group which an object that the operating object touches belongs to.

In a case where an character input object belonging to a first group and an operation object belonging to a second group, which is for operating a screen currently being displayed, are displayed on the display section, and when the proximity determination section determines that the operating object touches the display surface, the operation-lock determination section may detect which of the first group and the second group the operating object touches, and may disable an operation input to an object belonging to a group different from a group which an object that the operating object touches belongs to.

Further, in a case where a scrollable region and link information associated with a predetermined process, which is included in the scrollable region, are displayed on the display section, and when the proximity determination section determines that the operating object touches the display surface, the operation-lock determination section may detect which of an object in the scrollable region and an object in the link information the operating object touches, and may disable an operation input to an object belonging to a group different from a group which an object that the operating object touches belongs to.

Alternatively, in a case where a plurality of item selection objects classified into groups in accordance with a relationship of items to be selected are displayed on the display section, and when the proximity determination section determines that the operating object touches the display surface, the operation-lock determination section may detect a group which the object that the operating object touches belongs to, and may disable an operation input to an object belonging to a group different from the group which the object that the operating object touches belongs to.

In addition, in a case where a plurality of scrollable regions belonging to different groups are displayed on the display section, and when the proximity determination section determines that the operating object touches the display surface, the operation-lock determination section may detect, from among the plurality of scrollable regions, a first scrollable region corresponding to a position which the operating object touches, and may disable an operation input to the scrollable region other than the first scrollable region.

The information processing apparatus according to an embodiment of the present disclosure may further include a pressure detection section capable of detecting pressing force to the display surface. When the pressure detection section detects pressing force equal to or higher than a predetermined value, the operation-lock determination section may enable an operation input to the object, the operation input to which is disabled, even when the operating object is placed within the proximity detection region.

Further, when there is the object, the operation input to which is disabled, and when an operation input to the object, the operation input to which is enabled, is not detected for a predetermined time period or longer, the operation-lock determination section may enable the operation input to the object, the operation input to which is disabled, even when the operating object is placed within the proximity detection region.

According to another embodiment of the present disclosure, there is provided an information processing method which includes detecting, by a detection section, contact of an operating object with and proximity of the operating object to a display surface of a display section on which objects classified into groups in accordance with a relationship between the objects are displayed, determining, by a proximity determination section, a degree of proximity of the operating object to the display surface based on a detection result obtained by the detection section, and disabling, when the proximity determination section determines that the operating object touches the display surface, an operation input to an object belonging to a group different from a group which an object that the operating object touches belongs to, until the operating object is positioned outside a proximity detection region, the proximity detection region being a region from the display surface to positions which are a predetermined distance away therefrom.

According to another embodiment of the present disclosure, there is provided a computer program for causing a computer to function as an information processing apparatus which includes a detection control section configured to cause a detection section to detect contact of an operating object with and proximity of the operating object to a display surface of a display section on which objects classified into groups in accordance with a relationship between the objects are displayed, a proximity determination section configured to determine a degree of proximity of the operating object to the display surface based on a detection result obtained by the detection section, and an operation-lock determination section configured, when the proximity determination section determines that the operating object touches the display surface, to disable an operation input to an object belonging to a group different from a group which an object that the operating object touches belongs to, until the operating object is positioned outside a proximity detection region, the proximity detection region being a region from the display surface to positions which are a predetermined distance away therefrom.

According to the embodiments of the present disclosure described above, there can be provided the information processing apparatus, the information processing method, and the computer program, which are capable of preventing an erroneous operation of a user and making it easier to perform an operation input intended by the user.

BRIEF DESCRIPTION OF THE DRAWINGS

FIG. 10 is an explanatory diagram showing a flow of operation-lock processing when a finger touches the OSK first;

FIG. 14 is an explanatory diagram illustrating a case of applying the operation-lock processing according to the embodiment to prevent an erroneous operation when there are a plurality of targets to be scrolled.

DETAILED DESCRIPTION OF THE EMBODIMENT(S)

Figure 1:
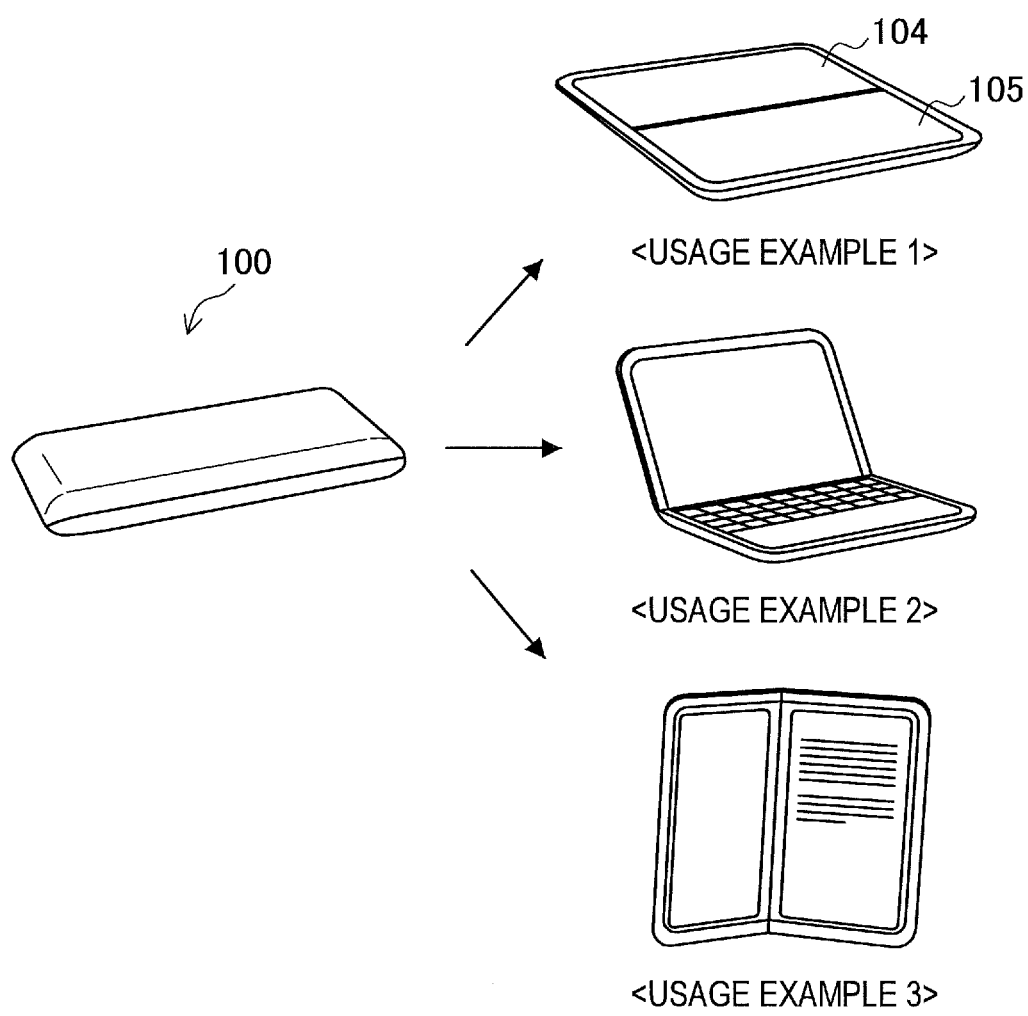
FIG. 1 is an explanatory diagram showing a schematic configuration of an information terminal according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be given in the following order.

1. Outline of information terminal
2. Configuration of information terminal (example of hardware configuration, example of screen configuration of information terminal, and functional configuration of information terminal)
3. GUI component-operation-lock processing (outline of operation-lock processing, and variations)

<1. Outline of Information Terminal>

First, with reference to FIG. 1, a schematic configuration of an information terminal 100 according to an embodiment of the present disclosure will be described. Note that FIG. 1 is an explanatory diagram showing the schematic configuration of the information terminal 100 according to the embodiment of the present disclosure.

The information terminal 100 of the present embodiment is, as shown in FIG. 1, a foldable device having two screens. The two screens are formed of two display sections (a first display device 104 and a second display device 105) which are placed next to each other. As shown in a usage example 1 of FIG. 1, the user can open the information terminal 100 in a manner that the first display device 104 and the second display device 105 are in one plane, and can use the two display sections as one screen. The user can visually recognize displayed information on the larger screen.

Further, as shown in a usage example 2 of FIG. 1, for example, the information terminal 100 may be placed horizontally and opened, and the information terminal 100 can be used in a state of being bent, in a manner that an OSK is displayed on one display device and information that is input using the OSK is displayed on the other display device. Alternatively, as shown in a usage example 3 of FIG. 1, for example, the information terminal 100 may be placed vertically and opened, and the information terminal 100 can be used in a state of being bent, in a manner that a text is displayed on one display device and information related to the contents of the text, such as an illustration, is displayed on the other display device. The user can use the information terminal 100 as an electronic book.

In this manner, the information terminal 100 according to the present embodiment can be used in various ways. Hereinafter, there will be described a detailed configuration of the information terminal 100 and operation-lock processing performed by an information processing apparatus provided thereto.

<2. Configuration of Information Terminal>

[Example of Hardware Configuration]

Figure 2:
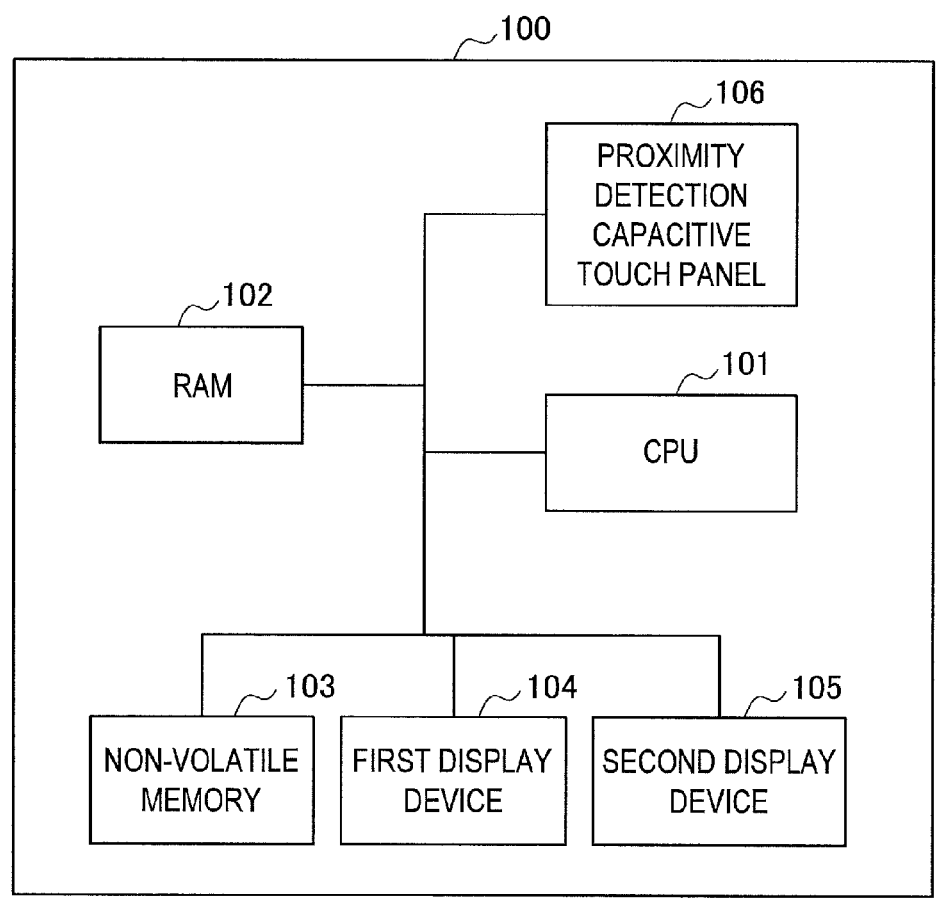
FIG. 2 is a block diagram showing a hardware configuration of the information terminal according to the embodiment.

First, with reference to FIG. 2, a hardware configuration of the information terminal 100 according to the present embodiment will be described. Note that FIG. 2 is a block diagram showing the hardware configuration of the information terminal 100 according to the present embodiment.

The information terminal 100 according to the present embodiment is a device including a detection section which is capable of detecting a contact position of an operating object with a display surface of a display device, and which is capable of detecting a degree of proximity between the display surface of the display device and the operating object at the upper side of the display surface. The information terminal 100 includes, as shown in FIG. 2, a CPU 101, a RAM (Random Access Memory) 102, a non-volatile memory 103, the first display device 104, the second display device 105, and a proximity detection capacitive touch panel 106.

As described above, the CPU 101 functions as an arithmetic processing unit and a control unit, and controls entire operation of the information terminal 100 in accordance with various programs. Further, the CPU 101 may be a microprocessor. The RAM 102 temporarily stores a program used for execution of the CPU 101 and a parameter that appropriately changes during execution thereof. They are connected with each other via a host bus configured from a CPU bus or the like. The non-volatile memory 103 stores a program, a calculation parameter, and the like used by the CPU 101. As the non-volatile memory 103, there can be used a ROM (Read Only Memory) and a flash memory, for example.

The first display device 104 and the second display device 105 are each an example of an output device which outputs information. As the first display device 104 and the second display device 105, there can be used a liquid crystal display (LCD) device and an OLED (Organic Light Emitting Diode) device, for example. In the present embodiment, although there are used the same display devices for the first display device 104 and the second display device 105, the present disclosure is not limited to such an example, and the display devices used for the first display device 104 and the second display device 105 may be different from each other.

The proximity detection capacitive touch panel 106 is an example of an input device to which the user inputs information, and is configured from input means for inputting the information and an input control circuit which generates an input signal based on the input by the user and outputs the generated input signal to the CPU 101. In the information terminal 100 according to the present embodiment, the proximity detection capacitive touch panel 106 is provided in a stacked manner on each of the display surfaces of the first display device 104 and the second display device 105. Accordingly, when the user brings his/her finger or the like closer to the display surface, the proximity detection capacitive touch panel 106 can detect a degree of proximity between the display surface and the finger. The degree of proximity between the display surface and the finger detected by the proximity detection capacitive touch panel 106 is represented by, for example, a distance between the display surface and the finger, or a determination result of whether or not a position of the finger is present within a proximity detection region, the proximity detection region being a region from the display surface to positions that are a predetermined distance away therefrom.

[Example of Screen Configuration of Information Terminal]

It is assumed that the information terminal 100 is used in various ways, as described with reference to FIG. 1. Hereinafter, as one of the forms in which the information terminal 100 is used, a case is considered, where there is performed an execution instruction of a setup wizard application typified by service account-creation or the like and an OSK-execution application in a single screen.

Figure 3:
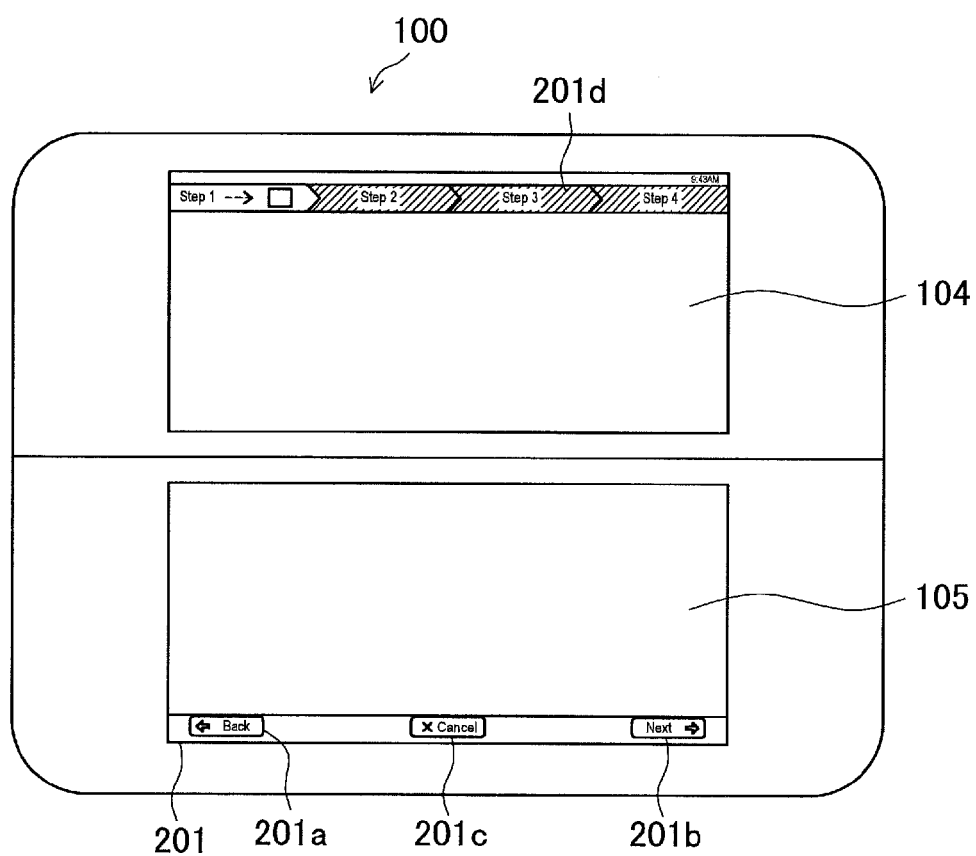
FIG. 3 is an explanatory diagram showing a state where a navigation bar is displayed on the lower side of a second display device of the information terminal.

When the setup wizard application is executed, a navigation bar 201 is displayed on the lower side of the second display device 105 of the information terminal 100, for example, as shown in FIG. 3. The navigation bar 201 is displayed for managing transition of screens in the setup wizard. On the navigation bar 201, there is displayed a button group for performing navigation to the screen currently being displayed, including a "Back" button 201a for returning to the previous page, a "Next" button 201b for proceeding to the next page, and a "Cancel" button 201c for cancelling the setup wizard. The button group displayed on the navigation bar 201 may additionally include a button for skipping the current page.

Further, a screen transition status in the setup wizard may be displayed as a screen transition bar 201d on the upper side of the first display device 104, for example. The user can recognize a progress status of the setup by seeing the display contents of the screen transition bar 201d.

Figure 4:
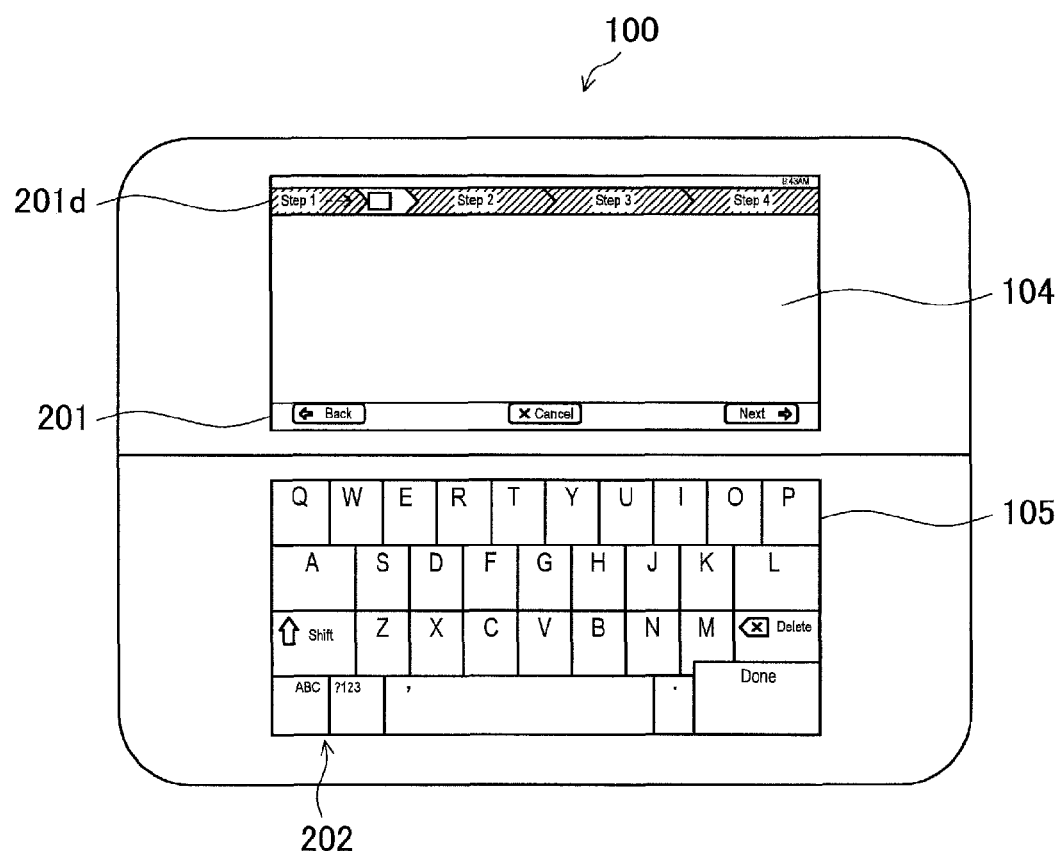
FIG. 4 is an explanatory diagram showing a state where the navigation bar is displayed on the lower side of a first display device of the information terminal and an OSK is displayed on the second display device of the information terminal.

A text input into an edit box or the like on the setup wizard can be performed by, as shown in FIG. 4 for example, causing the navigation bar 201 to be displayed on the lower side of the first display device 104 and causing an OSK 202 to be displayed on the second display device 105. Here, in the setup wizard, it becomes necessary to perform an operation of going back or forward a plurality of successive screens at once, owing to the operation characteristics that the operation is performed by the screen transition. However, when the screen state shown in FIG. 3 and the screen state shown in FIG. 4 are mixed, it is necessary that the user re-recognize which of the first display device 104 and the second display device 105 a current display position of the navigation bar 201 is displayed on, each time the display contents of the screens change. In this case, there is an issue that it is necessary that user search again for a button to be operated, and hence, a burden imposed on the user at the time of the batch screen transition operation becomes greater.

Figure 5:
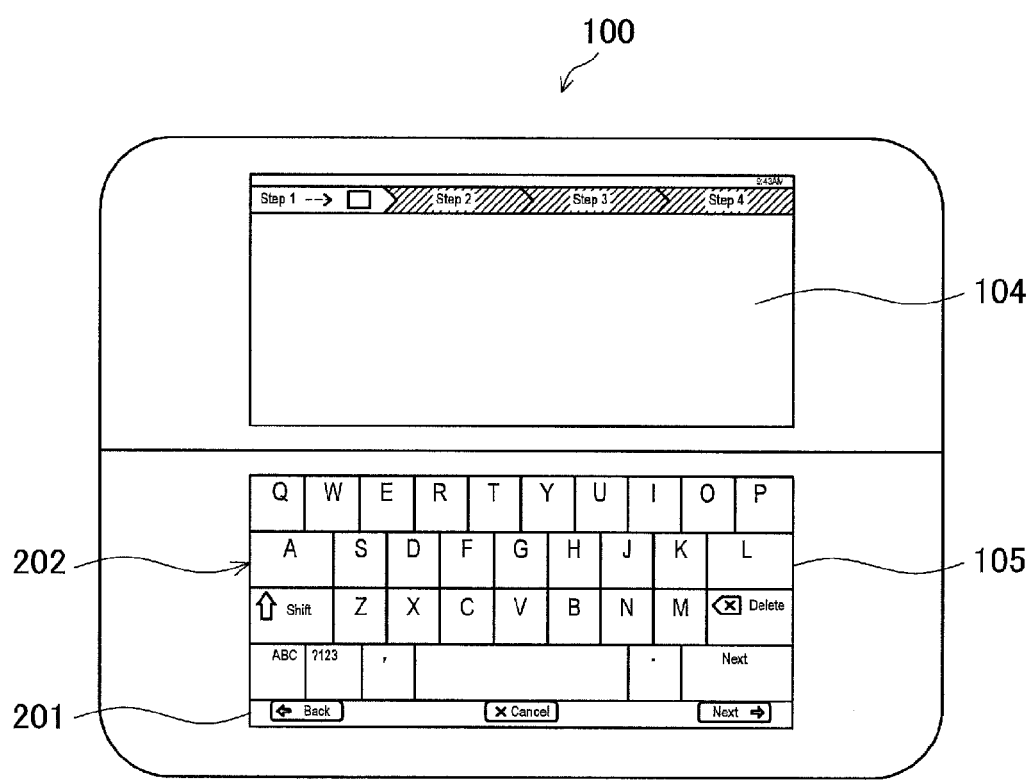
FIG. 5 is an explanatory diagram showing a state where the navigation bar and the OSK are displayed on the second display device of the information terminal.

On the other hand, as shown in FIG. 5, the case is considered, where the navigation bar 201 and the OSK 202 are displayed adjacent to each other on a single screen (for example, the second display device 105). In this case, the navigation bar 201, which is used for causing processing that gives relatively great influence such as input-cancel to a screen currently being displayed to be executed, and the OSK 202, which is used for performing operation input at a high speed, are placed side-by-side in the single screen. When the GUI components having different usage purposes are placed adjacent to each other as described above, it becomes highly possible that the user performs an unintended operation input, and a risk that the user may perform an erroneous operation becomes high.

Accordingly, the information terminal 100 according to the present embodiment includes an operation control section for preventing erroneous operation between the navigation bar 201 and the OSK 202 in the case where the GUI components having different usage purposes are placed adjacent to each other as shown in FIG. 5. The operation control section prevents the erroneous operation by locking an operation to a GUI component which is not an operation target, based on a detection result obtained by the proximity detection capacitive touch panel 106. Accordingly, with reference to FIG. 6, there will be described a functional configuration of an information terminal 100 which includes the operation control section. Note that FIG. 6 is a functional block diagram showing the functional configuration of the information terminal 100 according to the present embodiment.

[Functional Configuration of Information Terminal]

Figure 6:
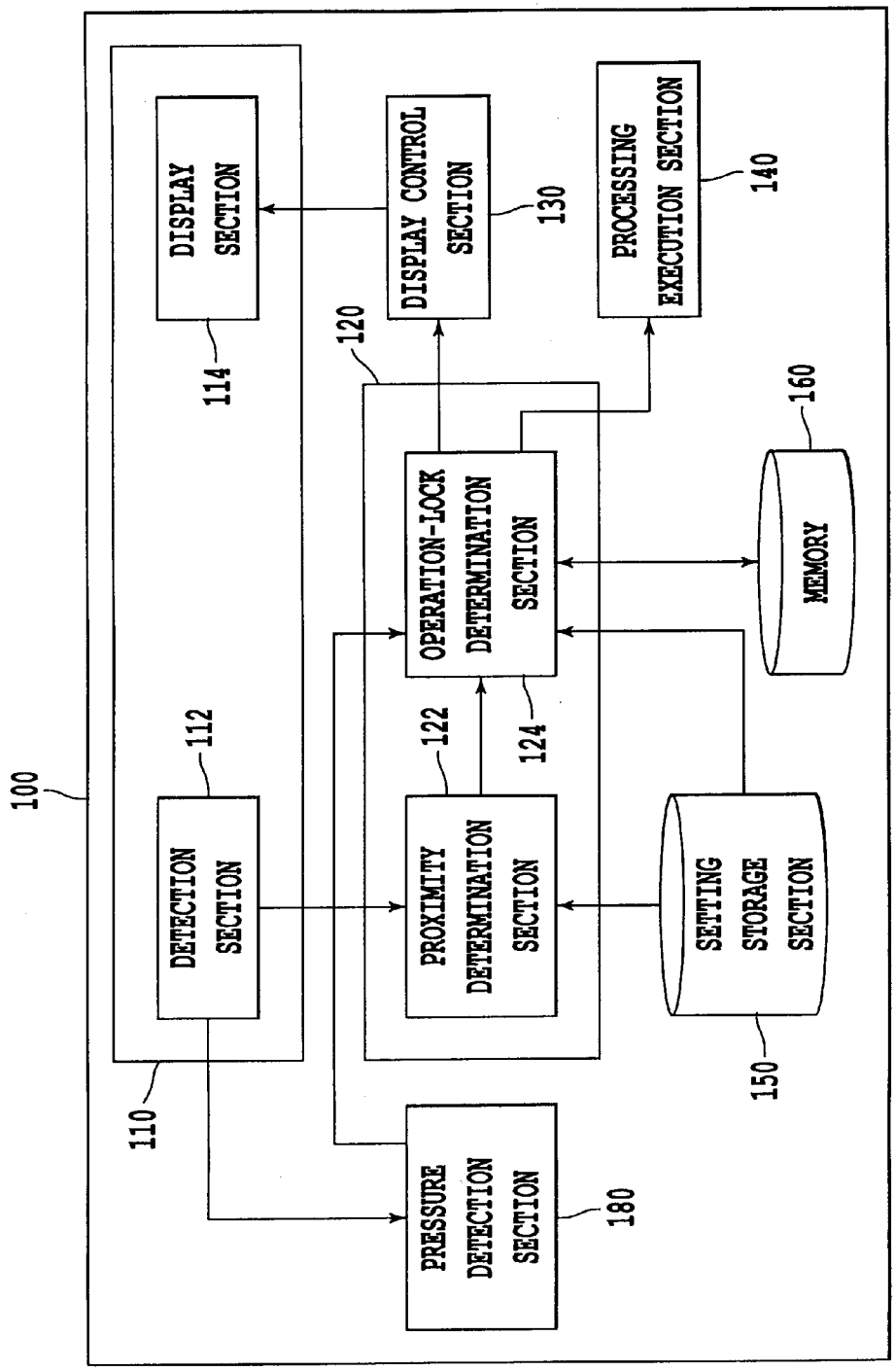
FIG. 6 is a functional block diagram showing a functional configuration of the information terminal according to the embodiment.

The information terminal 100 includes, as shown in FIG. 6, an input display section 110, an operation control section 120, a display control section 130, a processing execution section 140, a setting storage section 150, and a memory 160.

The input display section 110 is a functional section for displaying information and also for inputting information, and includes a display section 114, and a detection section 112 for detecting a degree of proximity to a display surface of the display section 114. The detection section 112 corresponds to the proximity detection capacitive touch panel 106 of FIG. 2. In this case, the detection section 112 detects a value of capacitance which changes in accordance with a proximity distance between the operating object and the display surface of the display section 114. When the operating object comes close to the display surface and a distance between the operating object and the display surface becomes equal to or less than a predetermined value, the capacitance detected by the detection section 112 increases, and as the operating object comes even closer to the display surface, the capacitance further increases. Then, when the operating object touches the display surface, the capacitance detected by the detection section 112 becomes the maximum value.

The detection section 112 of the present embodiment may detect a distance between the finger and the display surface of each of the first display device 104 and the second display device 105, or may detect whether or not the finger is present within a proximity detection region, the proximity detection region being a region from the display surface to positions that are a predetermined distance away therefrom. The detection section 112 outputs the detected capacitance value to the operation control section 120 as a detection result.

The display section 114 is an output device for displaying information, which corresponds to the first display device 104 and the second display device 105 shown in FIG. 2. On the display section 114, there are displayed the navigation bar 201 and the OSK 202, for example. Further, the display section 114 displays, in response to processing executed in accordance with an operation input from the user, display information changed by the display control section 130.

The operation control section 120 is a control section for locking an operation to a GUI component which is not an operation target, based on the detection result obtained by the detection section 112, and includes a proximity determination section 122 and an operation-lock determination section 124.

The pressure detection section 180 detects whether a pressing force applied to the display surface is greater than or equal to a predetermined value in order set a region in an operation-locked state. More particularly, the operation-lock determination section 124 uses a detection result from the pressure detection section 180 to set a region other than the region for performing the operation input in the operation-locked state. The proximity determination section 122 determines whether or not the finger is present within the proximity detection region based on the detection result obtained by the detection section 112, and also determines whether or not the finger touches the display surface of the first display device 104 or the second display device 105. That is, the proximity determination section 122 detects a degree of proximity of the finger to (including contact with) the display surface of the display section 114. For example, as shown in FIG. 5, when the navigation bar 201 and the OSK 202 are displayed on the second display device 105, an operable GUI component is decided by the operation-lock determination section 124 in accordance with a contact state of the finger with the display surface of the second display device 105. Further, the operation-lock determination section 124 decides release of the operation-lock of a GUI component which is set to be inoperable in accordance with the contact state of the finger with the display surface of the second display device 105.

Figure 7:
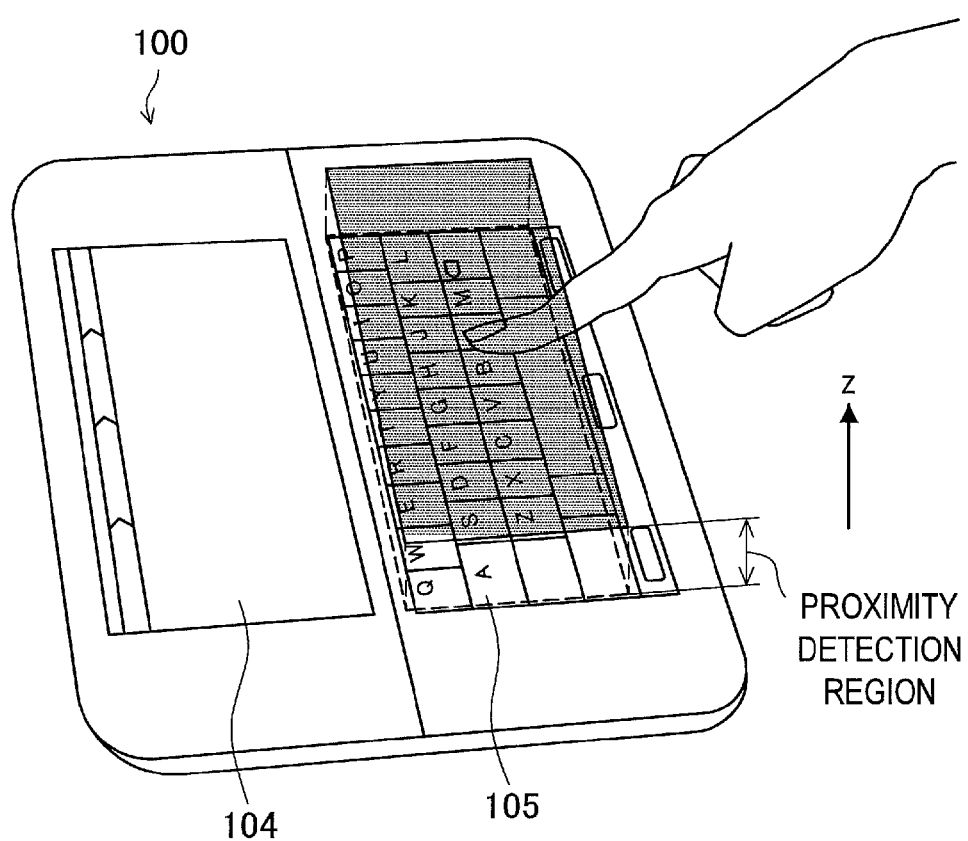
FIG. 7 is an explanatory diagram showing a positional relationship between a display surface and a proximity detection region of the information terminal.
Figure 8:
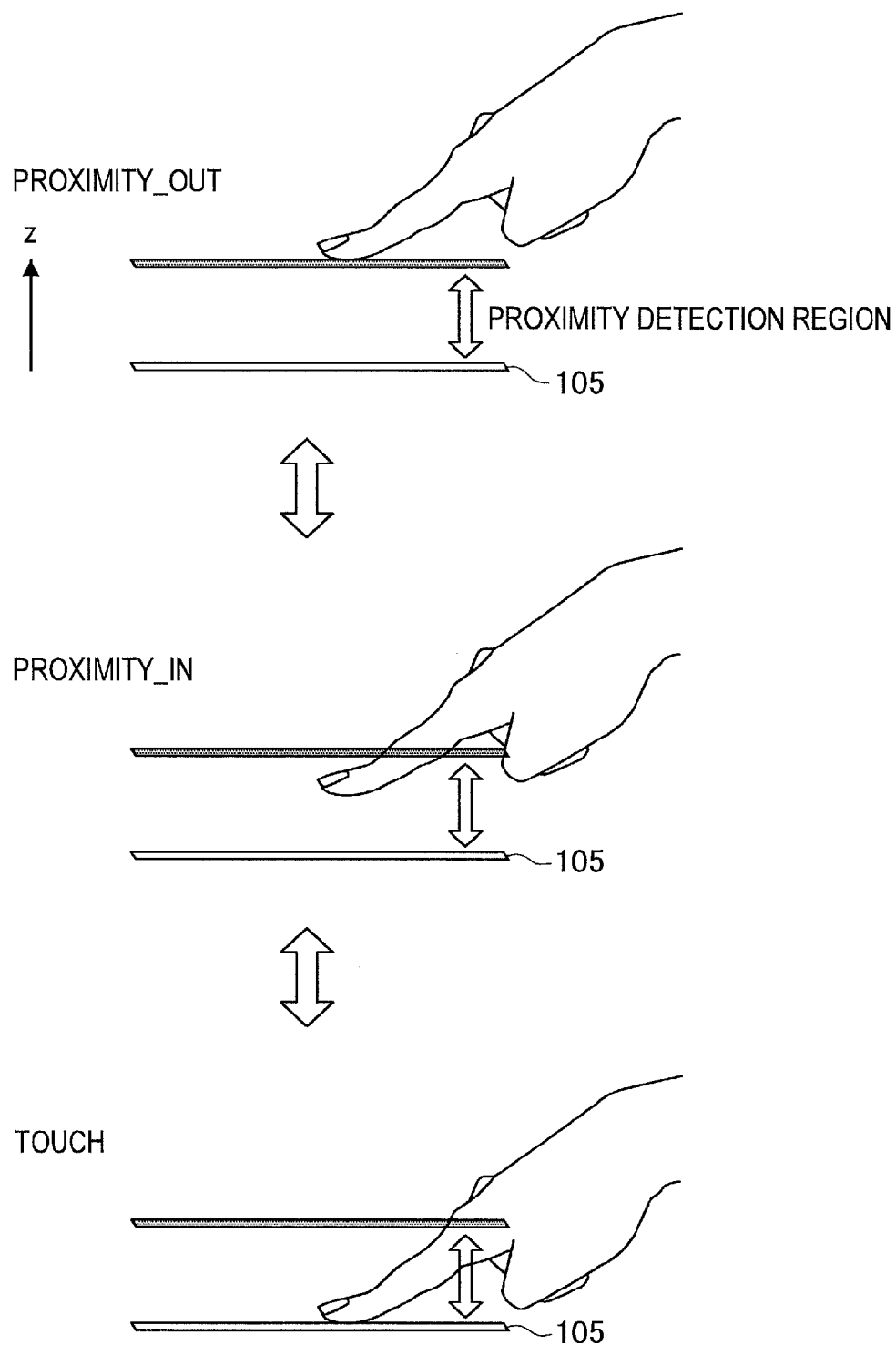
FIG. 8 is an explanatory diagram showing a positional relationship of a finger with respect to the display surface detected by a detection section.

To describe the above in more detail, as shown in FIG. 7 and FIG. 8, there is set a proximity detection region, which represents a region from the display surface to positions that are a predetermined distance away therefrom in a vertical direction (z-direction) with respect to the display surface of the second display device 105.

The proximity determination section 122 determines, in accordance with the change in capacitance, which of the following three states the finger is in: a state where the finger is positioned outside the proximity detection region (PROXIMITY_OUT); a state where the finger is positioned inside the proximity detection region (PROXIMITY_IN); and a state where the finger is in contact with the display surface (TOUCH). The proximity determination section 122 outputs the determination result to the operation-lock determination section 124.

The operation-lock determination section 124 determines availability of operation of the GUI component displayed on the display device based on the determination result obtained by the proximity determination section 122. In the present embodiment, when it is detected that the finger is in the state of being in contact with the display surface, the operation-lock determination section 124 creates an operation-locked state. The operation-locked state represents a state where an operation input to a GUI component belonging to a group other than the group which the GUI component that the finger touches belongs to is disabled. Then, the operation-lock determination section 124 maintains the operation-locked state of the GUI component belonging to the group other than the group which the GUI component that the finger touches belongs to, until the finger is positioned outside the proximity detection region thereafter. In this manner, by disabling the operation input to the GUI component belonging to the group other than the group which the GUI component that the finger touches belongs to, the execution of processing caused by the user's unintended operation input can be prevented. The operation-lock determination section 124 notifies the display control section 130 and the processing execution section 140 of the GUI component, the operation input to which is enabled, and the GUI component, the operation input to which is disabled.

The display control section 130 changes the information displayed on the display section 114 based on the determination result obtained by the operation-lock determination section 124. The display control section 130 changes the display information based on the operation input to the GUI component, the operation input to which is enabled, and on the other hand, the display control section 130 does not change the display information based on the operation input to the GUI component, the operation input to which is disabled. The display control section 130 outputs the changed display information to the display section 114.

The processing execution section 140 executes processing corresponding to the operation input based on the determination result obtained by the operation-lock determination section 124. The processing execution section 140 executes the processing corresponding to the operation input based on the operation input to the GUI component, the operation input to which is enabled, and on the other hand, the processing execution section 140 does not execute the processing corresponding to the operation input based on the operation input to the GUI component, the operation input to which is disabled. Accordingly, only the processing corresponding to the user's intended operation input is executed, and hence, erroneous operation can be prevented.

The setting storage section 150 stores setting information which is necessary for performing operation-lock determination. As the setting information stored in the setting storage section 150, there are given, for example, proximity determination information such as a capacitance value (proximity-capacitance value) used for determining that the finger is present within a proximity determination region, and a capacitance value (contact-capacitance value) at the time of the finger is in contact with the display surface. Further, in the setting storage section 150, there are also stored, as the setting information, group information representing a group that each GUI component belongs to. The setting information in the setting storage section 150 may be stored in advance, or may be stored by the user. The proximity determination section 122 determines a proximity state of the finger to the display surface by referring to the proximity determination information stored in the setting storage section 150. Further, the operation-lock determination section 124 performs the decision of the GUI component to be set into the operation-locked state by referring to the group information stored in the setting storage section 150.

The memory 160 temporarily stores information which is necessary for performing the operation-lock determination. For example, in the memory 160, there are stored by the operation-lock determination section 124, a current finger proximity state and group information (operation-lock information) of the GUI component, the operation input to which is disabled.

<3. GUI Component-operation-lock Processing>

The information terminal 100 including the above-mentioned functional configuration enables an operation input to a GUI component, which belongs to the same group as the group that a GUI component displayed at a position on a display surface which a user touches with his/her finger belongs to, and the information terminal 100 disables an operation input to another GUI component. Accordingly, an erroneous operation caused by user's unintended operation input can be prevented. Hereinafter, there will be described GUI component-operation-lock processing performed by the information terminal 100 according to the present embodiment.

[Outline of Operation-lock Processing]

Figure 9:
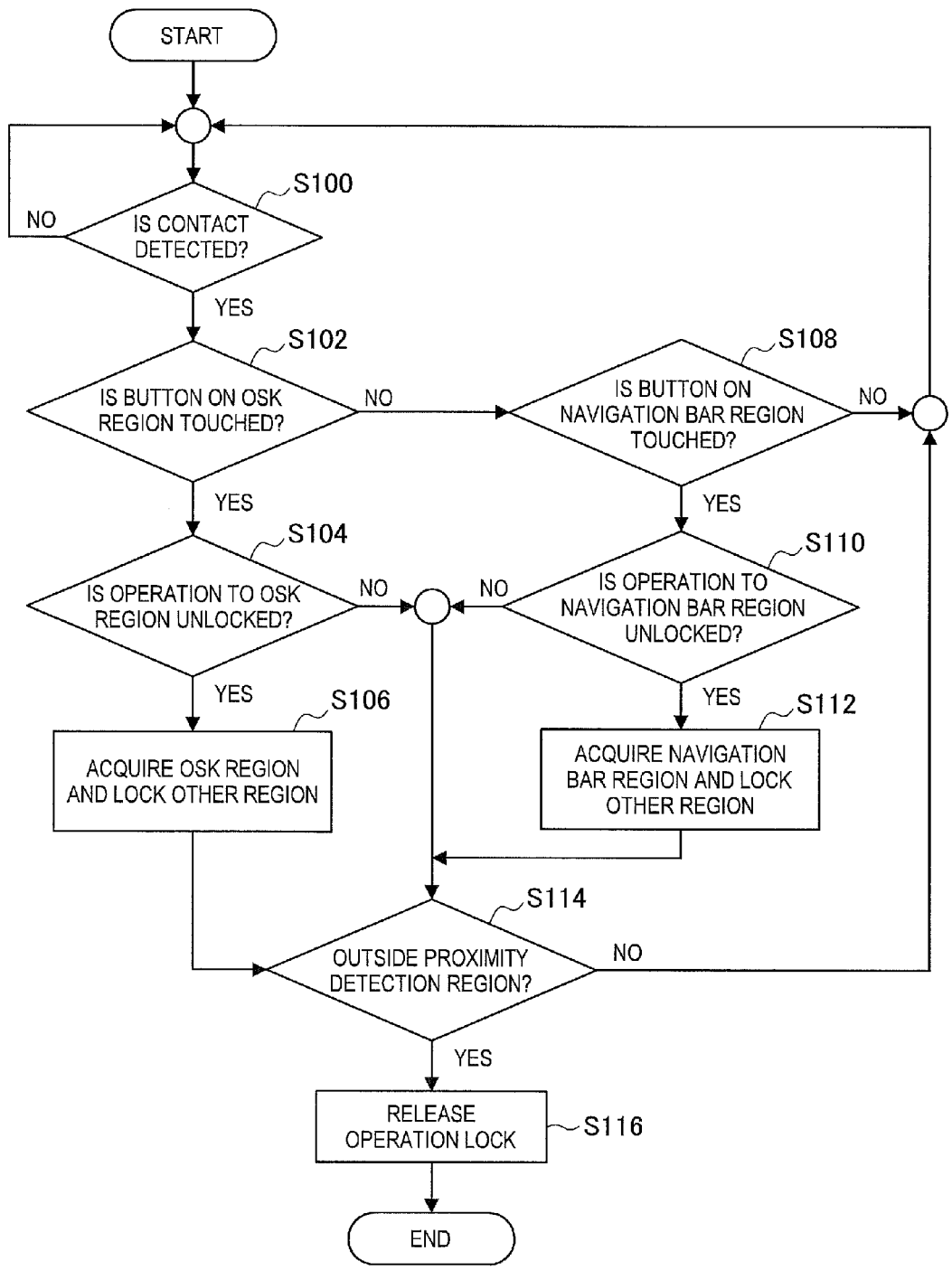
FIG. 9 is a flowchart showing GUI component-operation-lock processing performed by the information terminal according to the embodiment.

First, with reference to FIG. 9, there will be described operation-lock processing in a case where the navigation bar 201 and the OSK 202 are displayed on the second display device 105 as shown in FIG. 5. Note that FIG. 9 is a flowchart showing GUI component-operation-lock processing performed by the information terminal 100 according to the present embodiment. Here, each of the buttons provided on the navigation bar 201 or each of the keys which form the OSK 202 is a GUI component (object). Each button provided on the navigation bar 201 belongs to a group of the navigation bar 201, and each key that forms the OSK 202 belongs to a group of the OSK 202. In the present disclosure, one or more objects are included in one group.

The detection section 112 detects a capacitance value that changes by bringing, by the user, his/her finger closer to or away from the display surface of the second display device 105. A detection result obtained by the detection section 112 is output to the proximity determination section 122, and the proximity determination section 122 determines whether or not the finger touches the display surface of the second display device 105 at a predetermined timing (for example, each time the detection result is obtained from the detection section 112) (S100). The proximity determination section 122 compares the capacitance value input from the detection section 112 with the contact-capacitance value stored in the setting storage section 150. Then, in the case where the detected capacitance value is equal to or more than the contact-capacitance value, the proximity determination section 122 determines that the finger touches the display surface, and proceeds to processing of Step S102. On the other hand, in Step S100, in the case where the detected capacitance value is less than the contact-capacitance value, it is determined that the finger does not touch the display surface, and the processing of Step S100 is repeated.

When it is determined that the finger touches the display surface, the operation-lock determination section 124 determines which region the finger touches. A position of the finger on the display surface may be the position where the capacitance value detected by the detection section 112 becomes the maximum value, or the position of the center of gravity of the region from which a capacitance of a predetermined value or larger is detected, and is managed as coordinate information. The operation-lock determination section 124 determines a region which a button at a position that the finger touches belongs to, and determines, among regions present on the display surface of the second display device 105, which region the finger is placed at.

In this example, on the display surface of the second display device 105, there are two regions, a region of the navigation bar 201 and a region of the OSK 202. First, the operation-lock determination section 124 determines whether or not the finger touches, within the display surface of the second display device 105, the OSK region on which the OSK 202 is displayed (S102). The OSK region on the display surface of the second display device 105 is stored in the setting storage section 150. The operation-lock determination section 124 determines whether or not the finger touches a button in the OSK region based on a coordinate position of the finger, and in the case of determining that the finger touches the button inside the OSK region, proceeds to processing of Step S104.

In Step S104, the operation-lock determination section 124 confirms whether or not the operation input to the OSK region is unlocked. Whether or not each region is in the operation-locked state can be confirmed based on the operation-lock information stored in the memory 160. In the case where the finger already touches a region of a GUI component belonging to the group other than the group which the OSK region belongs to, and the OSK region is in the operation-locked state, the operation input using the OSK 202 detected by Step S100 is considered to be user's unintended input. Accordingly, in the case where the OSK region is in the operation-locked state, the operation-lock determination section 124 disables the operation input to the OSK region. That is, the processing corresponding to the operation input performed by the processing execution section 140 is not executed, and the processing directly proceeds to Step S114.

On the other hand, in Step S104, in the case where the OSK region is in the operation-unlocked state, the operation-lock determination section 124 determines that the user intentionally performs the operation input using the OSK 202. In this case, the operation-lock determination section 124 acquires the OSK region, enables the operation input to this region, and sets the region of the GUI component belonging to the group different from the group which the OSK region belongs to, that is, a navigation bar region, as the operation-locked state (S106). The operation-lock determination section 124 records in the memory 160 the operation-lock information indicating that the region set as the operation-locked state, that is, the region on which the navigation bar 201 is displayed in this example, is in the operation-locked state.

In this way, after that, only the operation input to the OSK region is enabled until the finger goes out of the proximity detection region, and the operation input to another region is disabled. Accordingly, even when the operation input is performed to the region other than the OSK region, the processing corresponding thereto is not executed. Even when the user performs the operation input to the navigation bar 201 in error for the OSK 202, the navigation bar 201 being placed adjacent to the OSK 202, it is determined to be the erroneous operation, and hence, user's unintended processing can be prevented from being executed.

Returning to the description of Step S102, in the case where it is determined in Step S102 that the finger does not touch a button on the OSK region, next, the operation-lock determination section 124 determines whether or not the finger touches a button on the navigation bar region displayed on the navigation bar 201 in the second display device 105 (S108). The navigation bar region on the display surface of the second display device 105 is also stored in the setting storage section 150. In the same manner as in Step S102, the operation-lock determination section 124 determines whether or not the finger touches the button on the navigation bar region based on coordinates of the finger. Then, in the case where the operation-lock determination section 124 determines that the finger touches the button on the navigation bar region, the processing proceeds to Step S110.

In Step S110, the operation-lock determination section 124 confirms whether or not the operation input to the navigation bar region is unlocked. In the case where the finger already touches a region of a GUI component belonging to the group other than the group which the navigation bar region belongs to, and the navigation bar region is in the operation-locked state, the operation input using the navigation bar 201 detected by Step S100 is considered to be user's unintended input. Accordingly, the operation-lock determination section 124 refers to the memory 160 and confirms whether or not the navigation bar region is in the operation-locked state. In the case where the navigation bar region is in the operation-locked state, the operation-lock determination section 124 disables the operation input to the navigation bar region. That is, the processing corresponding to the operation input performed by the processing execution section 140 is not executed, and the processing directly proceeds to Step S114.

On the other hand, in Step S110, in the case where the navigation bar region is in the operation-unlocked state, the operation-lock determination section 124 determines that the user intentionally performs the operation input using the navigation bar 201. In this case, the operation-lock determination section 124 acquires the navigation bar region, enables only the operation input to this region, and sets a region other than the navigation bar region as the operation-locked state (S112). The operation-lock determination section 124 records in the memory 160 the operation-lock information indicating that the region set as the operation-locked state, that is, the region on which the OSK 202 is displayed in this example, is in the operation-locked state.

In this way, after that, only the operation input to the navigation bar region is enabled until the finger goes out of the proximity detection region, and the operation input to another region is disabled. Accordingly, even when the operation input is performed to the region other than the navigation bar region, the processing corresponding thereto is not executed. Even when the user performs the operation input to the OSK 202 in error for the navigation bar 201, the OSK 202 being placed adjacent to the navigation bar 201, it is determined to be the erroneous operation, and hence, user's unintended processing can be prevented from being executed.

Note that, in the case where it is determined in Step S108 that the finger does not touch a button on the navigation bar region, the processing corresponding to the finger contact detected by the detection section 112 at that time is not executed, and the processing from Step S100 may be repeated. Further, in this example, since two GUI components, the navigation bar 201 and the OSK 202, are displayed on the second display device 105, the position of the finger is only confirmed in the navigation bar region and the OSK region, but the present disclosure is not limited to such an example. For example, in the case where a plurality of GUI components are displayed on the display surface of the second display device 105, the region in which the finger is positioned may be determined for all the regions or a part of the regions in which respective GUI components are displayed.

In addition, in the present embodiment, the operation-lock determination section 124 determines, first, whether or not the finger touches the OSK region, and then determines whether or not the finger touches the navigation bar region, but the present disclosure is not limited to such an example. For example, the operation-lock determination section 124 may determine, first, whether or not the finger touches the navigation bar region, and then may determine whether or not the finger touches the OSK region, or the operation-lock determination section 124 may simultaneously perform determination processes with respect to all the regions for determining finger contact positions.

When the processing from Steps S102 to S112 is completed, the operation-lock determination section 124 determines whether or not the position of the finger goes out of the proximity detection region based on the proximity state of the finger determined by the proximity determination section 122 (S114). While the user is performing operation inputs within a single region, the user tends not to bring his/her finger largely away from the display surface, and tends to perform operation inputs continuously in the vicinity of the display surface (that is, within the proximity detection region). Consequently, in the case where the user brings his/her finger largely away from the display surface, that is, in the case where the user brings his/her finger outside the proximity detection region, the operation-lock determination section 124 determines that the user finishes the input in the region where the operation input is enabled. In this case, the operation-lock determination section 124 deletes the operation-lock information of the region that is set as the operation-locked state, which is stored in the memory 160, and releases the operation-locked state (S116). In this way, the sequence of operation-lock processing is completed.

On the other hand, in the case where it is determined in Step S114 that the finger is still present within the proximity detection region, the operation-lock determination section 124 determines that the input is continuously performed in the region where the operation input is enabled, and the processing from Step S100 is repeated.

In FIG. 10, there is shown a flow of operation-lock processing when the finger touches the OSK first. When contact of the finger with the display surface is detected by the detection section 112 (S100), the operation-lock determination section 124 specifies a region with which the finger is brought into contact. As shown in the left diagram of FIG. 10, in the case where the finger touches a button within the OSK region (S102), and in the case where the OSK region is in the operation-unlocked state (S104), the operation-lock determination section 124 sets, as shown in the middle diagram of FIG. 10, the navigation bar region in which the navigation bar 201 is displayed as the operation-locked state (S106). In this way, as shown in the right diagram of FIG. 10, even when there is an operation input to the navigation bar region which is the region other than the OSK region, the operation input is disabled, and the processing corresponding thereto is not executed.

The operation-locked state of the navigation bar region is continued until the finger is moved out of the proximity detection region (S114). When it is detected that the finger is moved out of the proximity detection region, the operation-lock determination section 124 releases the operation-locked state of the navigation bar region. In this way, in the case where an operation input using the OSK 202 is performed first, the operation input to the region other than the OSK region is disabled until it is determined that the input using the OSK 202 is finished, thereby preventing the erroneous operation.

Figure 11:
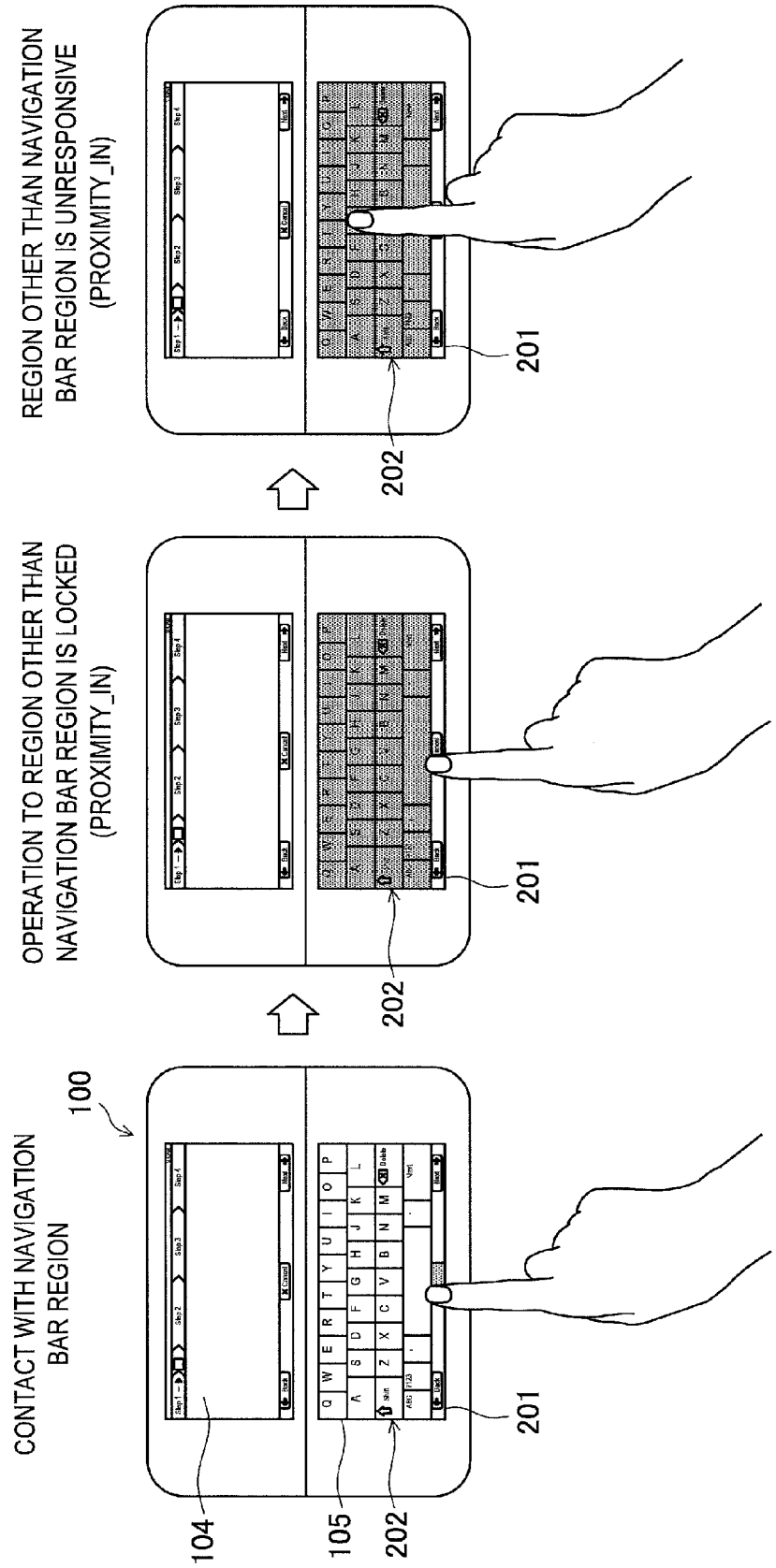
FIG. 11 is an explanatory diagram showing a flow of operation-lock processing when a finger touches the navigation bar first.

Next, with reference to FIG. 11, there will be described operation-lock processing when the finger touches the navigation bar 201 first. FIG. 11 shows an explanatory diagram showing a flow of operation-lock processing when the finger touches the navigation bar 201 first.

When contact of the finger with the display surface is detected by the detection section 112 (S100), the operation-lock determination section 124 specifies a region with which the finger is brought into contact. As shown in the left diagram of FIG. 11, in the case where the finger touches a button in the navigation bar region (S108), and in the case where the navigation bar region is in the operation-unlocked state (S110), the operation-lock determination section 124 sets, as shown in the middle diagram of FIG. 11, the OSK region in which the OSK 202 is displayed as the operation-locked state (S112). In this way, as shown in the right diagram of FIG. 11, even when there is an operation input to the OSK region which is the region other than the navigation bar region, the operation input is disabled, and the processing corresponding thereto is not executed.

The operation-locked state of the OSK region is continued until the finger is moved out of the proximity detection region (S114). When it is detected that the finger is moved out of the proximity detection region, the operation-lock determination section 124 releases the operation-locked state of the OSK region. In this way, in the case where an operation input using the navigation bar 201 is performed first, the operation input to the region other than the navigation bar region is disabled until it is determined that the input using the navigation bar 201 is finished, thereby preventing the erroneous operation.

[Variations]

The GUI component-operation-lock processing shown in FIG. 9 can be applied not only to between the navigation bar 201 and the OSK 202 shown in FIG. 10 and FIG. 11, but also to other GUI components, thereby preventing the erroneous operation between GUI components each belonging to different groups. The GUI component-operation-lock processing is performed based on group information of the GUI component stored in the setting storage section 150 in the same manner as described above.

(1) Screen Scrolling and Text Link Selection

Figure 12:
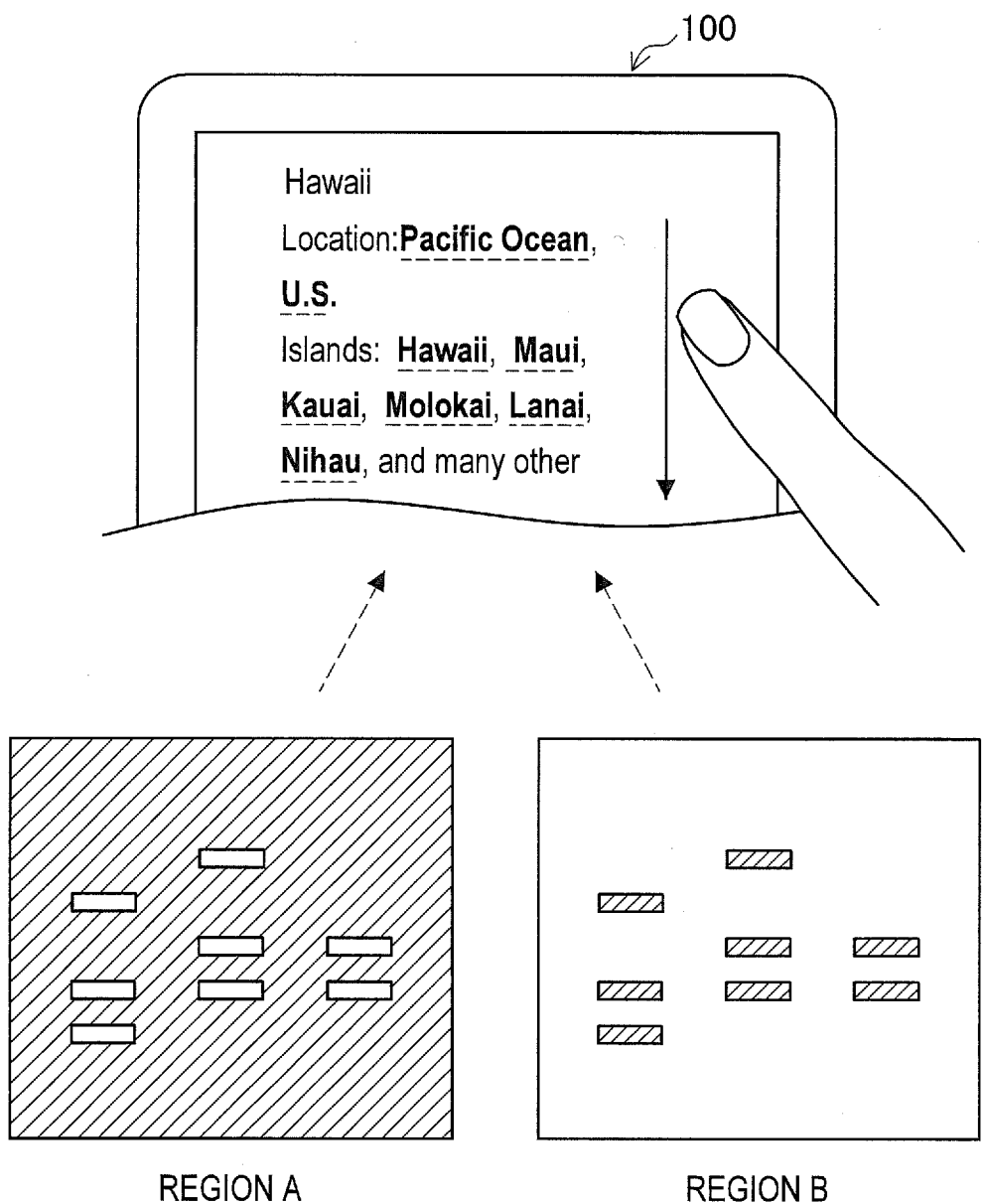
FIG. 12 is an explanatory diagram illustrating a case of applying the operation-lock processing according to the embodiment to prevent an erroneous operation between screen scrolling and text link selection.

First, as a state in which different GUI components are placed adjacent to each other, there is considered a case where, as shown in FIG. 12, a text is displayed in a display region, and a text link associated with other information is set in a character string of a part of the text. The user can scroll a screen by moving the finger in a predetermined direction on a display surface of an information terminal. At this time, when the user tries to scroll the screen and brings his/her finger in contact with the display surface, but accidentally touches a character string in which a text link is set, processing not intended by the user is executed, for example, information associated with the character string is displayed.

Accordingly, as shown in FIG. 12, the display region is divided into the following groups: a region A representing an area other than areas in which character strings in which the text links are set; and a region B representing the areas in which character strings are set. The information terminal 100 enables only the operation input to the region which the finger touches first, and disables the operation input to the other region until the finger goes out of the proximity detection region, thereby preventing the erroneous operation. That is, a GUI component included in the region A and a GUI component included in the region B belong to different groups, and when an operation input is started in one region, only the operation input to the GUI component belonging to the same group is enabled until the operation input to the region is finished.

Specifically, for example, when the finger touches first the region A, which represents the area other than areas in which character strings in which the text links are set, the region B in which character strings in which the text links are set are displayed is set as the operation-locked state. Accordingly, even if the user tries to scroll the screen, but touches a character strings in which the text link is set, the information linked thereto is not displayed, because the text link is in the operation-locked state. When the scrolling of the screen is finished and the user moves his/her finger out of the proximity detection region, the operation-locked state of the region B is released. On the other hand, in the case where the finger touches first the region B, the region A is in the operation-locked state until the finger is moved out of the proximity detection region.

In this way, in the case where there is an interaction with one region among display regions, an operation input to a region belonging to a group different from the group of the interaction is disabled, thereby preventing the erroneous operation between GUI components belonging to different groups.

(2) Selection in Item Selection Region

Figure 13:
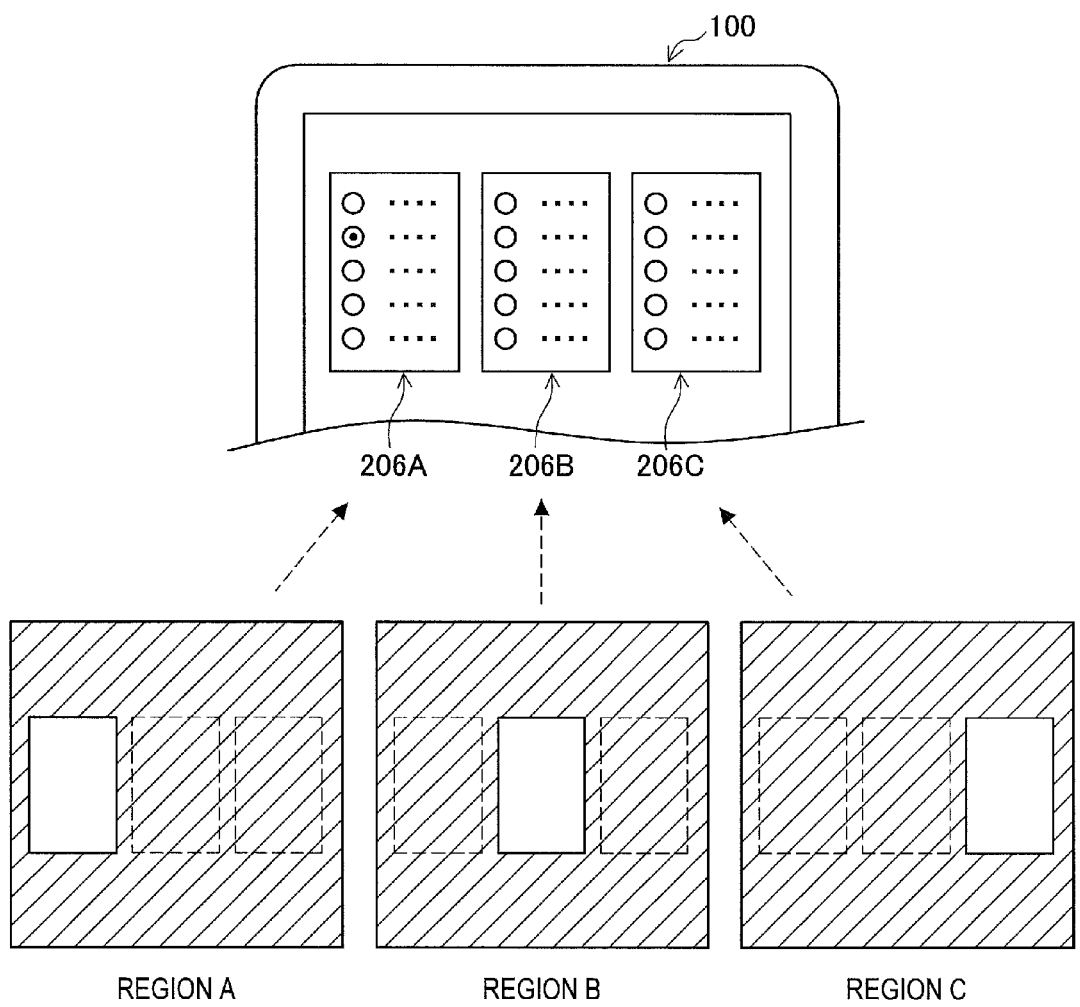
FIG. 13 is an explanatory diagram illustrating a case of applying the operation-lock processing according to the embodiment to prevent an erroneous operation between a plurality of item selection regions.

Next, as shown in FIG. 13, there is considered a case where a plurality of item selection regions, 206A to 206C, are displayed. From each of the item selection regions 206A to 206C, one item is selected from a plurality of items. In each of the item selection regions 206A to 206C, a plurality of items are displayed, and a radio button is associated with each of the items for selecting the item. Only one check mark can be placed among the radio buttons displayed in a single item selection region. When the item selection regions 206A to 206C are placed adjacent to each other on a small display region, in the case of, for example, selecting an item by placing a check mark in a radio button of the item selection region 206A, there is a possibility of erroneously selecting a radio button of another item selection region, 206B or 206C.

Accordingly, as shown in FIG. 13, the display region is divided into the following groups: a region A representing a display region of the item selection region 206A; a region B representing a display region of the item selection region 206B; and a region C representing a display region of the item selection region 206C. That is, GUI components included in the item selection regions 206A to 206C, respectively, belong to different groups. Then the information terminal 100 enables only the operation input to the region which the finger touches first, and disables the operation input to the other regions until the finger goes out of the proximity detection region, thereby preventing the erroneous operation.

Specifically, for example, when the finger touches first the region A, which represents the display region of the item selection region 206A, the regions other than the display region of the item selection region 206A are each set as the operation-locked state. Accordingly, even if the user tries to place a check mark in a radio button of the item selection region 206A, but touches a radio button of the item selection region B, a check mark is not placed in the radio button of the item selection region B, because the item selection region B is in the operation-locked state. Further, when an item is already selected in another item selection region B or C, a case of erroneously changing the selected item that does not have to be changed can be avoided.

After that, when the item selection in the item selection region A is finished and the user moves his/her finger out of the proximity detection region, the operation-locked state of the region other than the region A is released. Also in the same manner in the cases of the item selection regions B and C, when the finger first touches the region B or C, the regions other than the region B or C are each set as the operation-locked state until the finger is moved out of the proximity detection region. In this way, in the case where there is an interaction with one region among display regions, an operation input to a region belonging to a group different from the group of the interaction is disabled, thereby preventing the erroneous operation between GUI components belonging to different groups.

(3) Selection of Scroll Region

In the example of FIG. 14, there is shown a case where an entire screen displayed on the display region can be scrolled, and information displayed within the screen can also be scrolled separately. For example, in FIG. 14, a map 207 is displayed on the screen, and when the finger is moved on the map 207, the map 207 can be scrolled in accordance with the movement direction of the finger. In this case, when the user tries to scroll the map 207, but erroneously touches a knob 208 of a scroll bar 209, the entire screen is scrolled. On the other hand, when the user tries to scroll the entire screen but erroneously touches the map 207, the map 207 is scrolled.

Accordingly, as shown in FIG. 14, the display region is divided into the following groups: a region A representing a display region of the scroll bar 209; and a region B representing a display region of the map 207. The information terminal 100 enables only the operation input to the region which the finger touches first, and disables the operation input to the other region until the finger goes out of the proximity detection region, thereby preventing the erroneous operation.

Specifically, for example, when the finger touches first the region A in which the scroll bar 209 is displayed, the region other than the scroll bar 209 is set as the operation-locked state. Accordingly, even if the user erroneously brings his/her finger in contact with the map 207, the map 207 is not scrolled, because the map 207 is in the operation-locked state. After that, when the scrolling of the screen is finished and the user moves his/her finger out of the proximity detection region, the operation-locked state of the region other than the region A is released.

In the same manner, when the finger first touches the region B in which the map 207 is displayed, the region other than the map 207 is set as the operation-locked state. Accordingly, even if the user erroneously brings his/her finger in contact with the scroll bar 209, the entire screen is not scrolled, because the scroll bar 209 is in the operation-locked state. After that, when the scrolling of the map 207 is finished and the user moves his/her finger out of the proximity detection region, the operation-locked state of the region other than the region B is released. In this way, in the case where there is an interaction with one region among display regions, an operation input to a region belonging to a group different from the group of the interaction is disabled, thereby preventing the erroneous operation between GUI components belonging to different groups.

This example can effectively prevent an erroneous operation particularly when a region for performing scrolling is small. In this case, in the case where a scrolling operation in one region is enabled, the scrolling of the region that is the operation target may be performed even when the scrolling operation is performed in another region. That is, when there is a GUI component which is in the operation-locked state, and until the operating object goes out of the proximity detection region, the region in the operation-locked state is also caused to function in the same manner as the region, the operation input to which is enabled. Accordingly, the region for performing an operation input is enlarged, thereby making it easier to perform the operation.

Heretofore, there has been described the operation-lock processing for preventing the erroneous operation in the information terminal 100 according to the embodiments of the present disclosure. The information terminal 100 includes, as the detection section 112, the proximity detection capacitive touch panel 106 capable of detecting the proximity of the finger to the display surface and the contact of the finger with the display surface, and, based on the detection result obtained by the detection section 112, whether the finger is in or out of the proximity detection region is determined by the proximity determination section 122. After that, the operation-lock determination section 124 disables the operation input to the region other than the region which the user touches first with his/her finger until the finger moves out of the proximity detection region, based on the determination result obtained by the proximity determination section 122. Accordingly, the erroneous operation between different GUI components can be reduced.

It should be understood by those skilled in the art that various modifications, combinations, sub-combinations and alterations may occur depending on design requirements and other factors insofar as they are within the scope of the appended claims or the equivalents thereof.

For example, in the embodiments above, the operation-locked state is set when the finger touches a region within the display region, but the present disclosure is not limited thereto. For example, the information terminal 100 may be provided with a pressure detection sensor capable of detecting pressing force to the display surface, and when setting another region as the operation-locked state, the user may press the display surface at a pressure equal to or higher than a predetermined value. Accordingly, the user can explicitly set the region other than the region for performing the operation input as the operation-locked state. Alternatively, the region other than the region for performing the operation input may be set as the operation-locked state when a predetermined time period or longer is elapsed after an operation input within the region which the user touches first is finished.

Further, in the embodiments above, a display color of the GUI component may be changed depending on whether or not the GUI component is in the operation-locked state, for example. Accordingly, the GUI component in the operation-locked state and the GUI component, the operation input to which is enabled, can be visually recognized, and the operability can be enhanced.

The present disclosure contains subject matter related to that disclosed in Japanese Priority Patent Application JP 2010-183865 filed in the Japan Patent Office on Aug. 19, 2010, the entire content of which is hereby incorporated by reference.

What is claimed is:

1. An information processing apparatus comprising:
a detection section configured to detect contact of an operating object with and proximity of the operating object to a display surface of a display section on which objects classified into groups in accordance with a relationship between the objects are displayed;
a proximity determination section configured to determine a degree of proximity of the operating object to the display surface based on a detection result obtained by the detection section; and
an operation-lock determination section configured, when the proximity determination section determines that the operating object touches the display surface, to disable an operation input to an object belonging to a group different from a group which an object that the operating object touches belongs to, until the operating object is positioned outside a proximity detection region, the proximity detection region being a region from the display surface to positions which are a predetermined distance away therefrom.

2. The information processing apparatus according to claim 1,
wherein, when the proximity determination section determines that the operating object touches the display surface, the operation-lock determination section determines whether or not an operation input to an object that the operating object touches is disabled, and when the operation input to the object that the operating object touches is not disabled, the operation-lock determination section disables an operation input to an object belonging to a group different from the group which the object that the operating object touches belongs to.

3. The information processing apparatus according to claim 1, further comprising
a setting storage section configured to store a group which the object belongs to,
wherein the operation-lock determination section acquires, from the setting storage section, a group which an object that the operating object touches belongs to.

4. The information processing apparatus according to claim 1,
wherein, in a case where an character input object belonging to a first group and an operation object belonging to a second group, which is for operating a screen currently being displayed, are displayed on the display section, and when the proximity determination section determines that the operating object touches the display surface, the operation-lock determination section detects which of the first group and the second group the operating object touches, and disables an operation input to an object belonging to a group different from a group which an object that the operating object touches belongs to.

5. The information processing apparatus according to claim 1,
wherein, in a case where a scrollable region and link information associated with a predetermined process, which is included in the scrollable region, are displayed on the display section, and when the proximity determination section determines that the operating object touches the display surface, the operation-lock determination section detects which of an object in the scrollable region and an object in the link information the operating object touches, and disables an operation input to an object belonging to a group different from a group which an object that the operating object touches belongs to.

6. The information processing apparatus according to claim 1,
wherein, in a case where a plurality of item selection objects classified into groups in accordance with a relationship of items to be selected are displayed on the display section, and when the proximity determination section determines that the operating object touches the display surface, the operation-lock determination section detects a group which the object that the operating object touches belongs to, and disables an operation input to an object belonging to a group different from the group which the object that the operating object touches belongs to.

7. The information processing apparatus according to claim 1,
wherein, in a case where a plurality of scrollable regions belonging to different groups are displayed on the display section, and when the proximity determination section determines that the operating object touches the display surface, the operation-lock determination section detects, from among the plurality of scrollable regions, a first scrollable region corresponding to a position which the operating object touches, and disables an operation input to the scrollable region other than the first scrollable region.

8. The information processing apparatus according to claim 1, further comprising
a pressure detection section capable of detecting pressing force to the display surface,
wherein, when the pressure detection section detects pressing force equal to or higher than a predetermined value, the operation-lock determination section enables an operation input to the object, the operation input to which is disabled, even when the operating object is placed within the proximity detection region.

9. The information processing apparatus according to claim 1,
wherein, when there is the object, the operation input to which is disabled, and when an operation input to the object, the operation input to which is enabled, is not detected for a predetermined time period or longer, the operation-lock determination section enables the operation input to the object, the operation input to which is disabled, even when the operating object is placed within the proximity detection region.

10. The information processing apparatus according to claim 1, wherein the object belonging to the group different from the group which the object that the operating object touches belongs to is displayed concurrently with the group which the object that the operating object touches belongs to.

11. The information processing apparatus according to claim 1, wherein the operation-lock determination section disables the operation input to the object belonging to the group different from the group which the object that the operating object touches belongs to only during the period during which the operating object is positioned within the proximity detection region.

12. The information processing apparatus according to claim 11, wherein the operation-lock determination section enables the operation input to the object belonging to the group different from the group which the object that the operating object touches belongs to when the operating object is positioned outside the proximity detection region.

13. An information processing method comprising:
detecting, by a detection section, contact of an operating object with and proximity of the operating object to a display surface of a display section on which objects classified into groups in accordance with a relationship between the objects are displayed;
determining, by a proximity determination section, a degree of proximity of the operating object to the display surface based on a detection result obtained by the detection section; and
disabling, when the proximity determination section determines that the operating object touches the display surface, an operation input to an object belonging to a group different from a group which an object that the operating object touches belongs to, until the operating object is positioned outside a proximity detection region, the proximity detection region being a region from the display surface to positions which are a predetermined distance away therefrom.

14. A computer program for causing a computer to function as an information processing apparatus which includes
a detection control section configured to cause a detection section to detect contact of an operating object with and proximity of the operating object to a display surface of a display section on which objects classified into groups in accordance with a relationship between the objects are displayed,
a proximity determination section configured to determine a degree of proximity of the operating object to the display surface based on a detection result obtained by the detection section, and
an operation-lock determination section configured, when the proximity determination section determines that the operating object touches the display surface, to disable an operation input to an object belonging to a group different from a group which an object that the operating object touches belongs to, until the operating object is positioned outside a proximity detection region, the proximity detection region being a region from the display surface to positions which are a predetermined distance away therefrom.

* * * * *